United States Patent [19]

Mayszak

[11] Patent Number: 4,604,888
[45] Date of Patent: Aug. 12, 1986

[54] CABLE CLAMP, BODY PORTION THEREFOR AND METHOD OF MANUFACTURING SAME

[75] Inventor: Michael T. Mayszak, Villa Park, Ill.

[73] Assignee: Reliance Electric Company, Cleveland, Ohio

[21] Appl. No.: 751,442

[22] Filed: Jul. 3, 1985

Related U.S. Application Data

[62] Division of Ser. No. 638,296, Aug. 6, 1984.

[51] Int. Cl.[4] .............................................. B21D 53/36
[52] U.S. Cl. ......................................... 72/379; 24/525
[58] Field of Search .......................... 72/325, 326, 379

[56] References Cited

U.S. PATENT DOCUMENTS 4,136,423  1/1979  Sterling ............................. 24/122.6
4,418,471 12/1983  Torii et al. ............................. 72/332
4,495,790  1/1985  Muto et al. ............................ 72/326

FOREIGN PATENT DOCUMENTS 1587202  4/1981  United Kingdom ................... 72/379

Primary Examiner—Lowell A. Larson
Attorney, Agent, or Firm—Michael M. Rickin

[57] ABSTRACT

A clamp for electrical cables including a body portion of stamped metal. The body portion has two end walls extending at right angles to the base. At least a first pair of arms spaced intermediate along one edge of the base. The arms also extend outward at essentially right angles to the base such that they are parallel to the end walls. An arm and an associated end wall form a first channel. The movable jaw interfits below the arms and when tightened comes into compressive engagement with the cables in the channel.

3 Claims, 3 Drawing Figures

CABLE CLAMP, BODY PORTION THEREFOR AND METHOD OF MANUFACTURING SAME

This is a division of application Ser. No. 638,296, filed Aug. 6, 1984.

BACKGROUND OF THE INVENTION

1. Field of the Invention

This invention relates to electrical cable clamps, and more particularly relates to a clamp which is adapted to mechanically retain a plurality of cables in fixed disposition with each other and simultaneously couple in strain relieved configuration the conductive tubular shields of such cables to a common electrical ground.

2. Description of the Prior Art

In the electrical field, especially in telephone communication and transmission, it is frequently desirable to clamp a selective number of cables from a cable bundle in fixed disposition with each other preliminary to directing certain of the clamped cables to a certain location or zone. Such cables usually include a plurality of individual wire conductors which are encapsulated within an outer covering encased about a tubular extruded or braided sheath, preferably copper, which acts as an electrical shield for transmissions through the wire conductors themselves. The encircling conductive shield of these cables are usually coupled to a common electrical ground by way of a clamp compressively contacting the metallic sheath from which a portion of the outer cover has been skinned or stripped. The cables themselves are of various diameters depending upon the number and gauge of the individual wire conductors.

In the past, it has been the usual practice to provide a cable clamp wherein only a single cable was embraced by each jaw of a stacked array so that the cable in each set of jaws was retained in spaced parallel disposition with respect to the other clamped cable elements. Such prior cable clamps tended to distort the cables excessively and required excessive pressures in order to prevent loosening. In addition to these drawbacks, such clamps were likely to be expensive owing to the intricate nature of the cast or machine parts from which the clamp was assembled. Moreover, the use of a clamping arrangement in which only a single cable was retained within one set of jaws of a stacked set of such jaws necessarily increased the overall size of the cable clamp. Added to the mass of metal embodied within the clamp with consequent augmentation in cost and detracted from the ability of the clamp to function with uniform pressure upon the various cables being integrated. Yet another difficulty experienced with prior cable clamps was the problem of coupling them to a housing or bracket while at the same time threading or nesting of the individual cables within the jaw, such difficulty resulting from the unstable nature of the coupling mechanism which could not restrain rotational movement or twisting of the clamp either prior to or during the clamping procedure.

An example of one cable clamp which has attempted to overcome the problems described above is shown in U.S. Pat. No. 4,136,423 (hereinafter the '423 patent) which issued on Jan. 30, 1979 in the name of Maurice Sterling. The clamp shown therein includes a body portion and a jaw member. The cable is trapped between a flat surface and two edges of the body portion and the jaw member. Trapping the cable against the edges of the body portion may give rise to certain undesirable results in that only a small surface area of the body portion is in contact with the cable.

SUMMARY OF THE INVENTION

According to the present invention there is disclosed in electrical cable clamp of the type which has a body portion and a jaw movable with respect to the body portion. The body portion is formed from a resilient sheet metal stamping which is first bent into a generally U-shaped configuration to give rise to a base portion and two substantially parallel end walls.

A first pair of arms are spaced intermediate along one edge of the base. The arms extend at essentially right angles to the base so that they are parallel to each other and the end walls. Each arm forms with the associated one of the end walls a first U-shaped channel.

The jaw interfits below the arms. The clamp also includes a means to draw the jaw into compressive engagement with cables nested in the first channel.

DESCRIPTION OF THE PREFERRED EMBODIMENT

Figure 1:
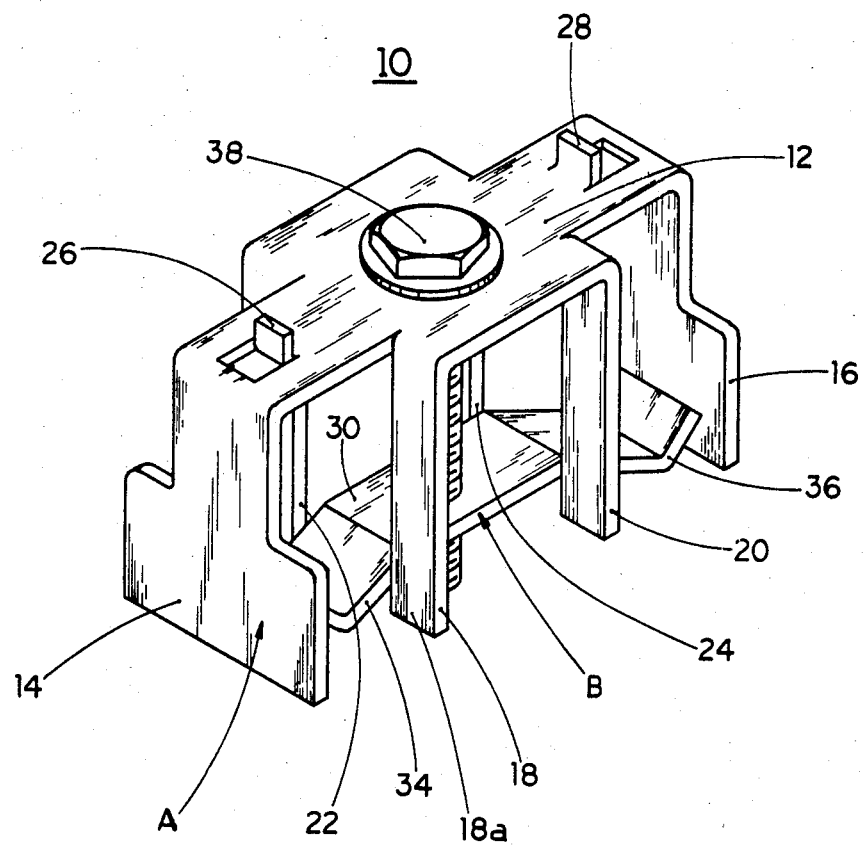
FIG. 1 is a perspective view of the cable clamp and body portion thereof embodying the invention.
Figure 2:
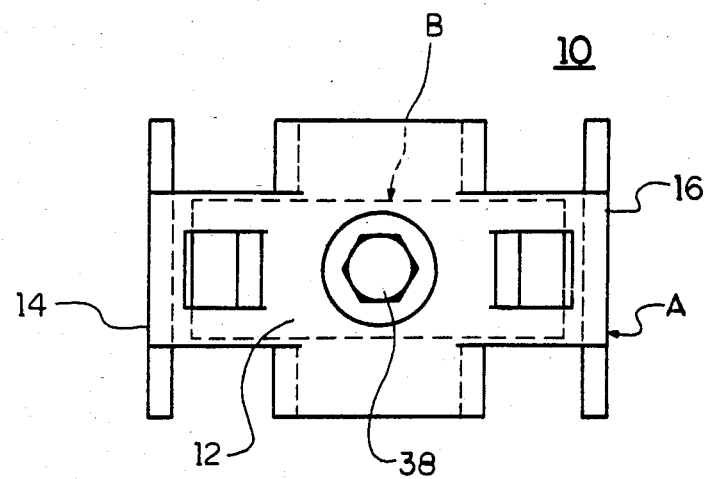
FIG. 2 is a front view of the cable clamp and body portion thereof of FIG. 1.
Figure 3:
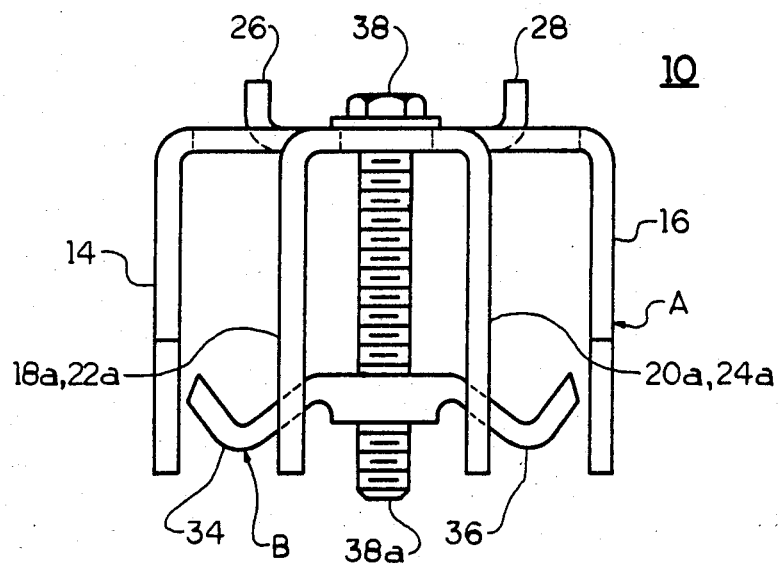
FIG. 3 is a top view of the cable clamp and body portion thereof of FIG. 1.

Referring now in greater detail to the drawings in which similar reference characters refer to similar parts, I show a cable clamp 10 for retaining one or more cables (not shown) in fixed disposition with each other and adapted to couple the electrical shield of such cables to a common electrical ground. The electrical cable clamp of this invention includes a body portion, generally designated as A, which permits nesting of one or more cables within each of two symmetrically disposed channels or guideways therein, a jaw member B adapted to be drawn into compressive engagement with the nested cables. The clamp may be used in conjunction with an appropriately shaped bracket as shown in the aforementioned '423 patent.

The clamp body A is preferably fabricated of a highly conductive metal, such as tin plated brass in sheet form. The body is first formed as a strip by stamping the metal. The strip is transformed into the body having three U-shaped sections in a row as shown in the drawings by first bending the end of the strip through a 90° angle. The middle U-shaped section or in effect the end walls 14, 16 of the body are then formed by shearing the four arms 18, 20, 22 and 24 from the side of the brass strip and then bending them through an angle of 90° such that arms 18 and 20 and arms 22 and 24 are parallel to each other and end walls 14, 16. This process also forms a U-shaped section which consists of arms 18 and 20 and a U-shaped section which consists of arms 22 and 24.

The body has two channels in which cables may be clamped. One channel is formed by end wall 14 in cooperation with the flat surface 18a of arm 18 and the flat surface 22a of arm 22. The other channel is formed by end wall 16 in cooperation with the flat surface 20a of arm 20 and the flat surface 22a of arm 22. The base 12 includes a centrally disposed opening which is adapted to receive a bolt 38. The bolt 38 threadedly engages the jaw member B and is maintained in coupled disposition therewith by upsetting the end of such bolt at 38a. Ears 26 and 28 are punched out of the base 12 in order to restrain clamp rotation during nesting of the cables and securing of the clamp to its associated bracket.

The jaw member B is also preferably made of a highly conductive material, such as brass and is of generally gull-shaped configuration. A central boss 30 at the middle of the jaw B includes a tapped opening in which the bolt 38 is threaddedly received, the upset end 38a of the bolt maintaining the jaw B in coupled relationship with the body portion A. A pair of wings 34 and 36 project symmetrically from the central boss 30, the span of the wings being slightly less than the distance between the interior surfaces of the end walls 14 and 16. The angled orientation of the wings 34 and 36 define clamping faces for compressing against the cables contained within the underlying channels when the bolt 38 threaddedly draws the jaw B down within the body A. The clearance between the threads of the bolt 38 and the tapped hole of boss 30 together with the tolerance between the neck of the bolt and the opening of body portion A through which the bolt passes enables the jaw B to skew when the clamped cross-section in the symmetrically disposed channels is unequal.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. The method of manufacturing from a strip of resilient sheet metal a body portion of an electrical cable clamp of the type which includes a jaw movable with respect to said body portion, comprising the steps of:
   (a) bending the ends of the strip through an angle of essentially ninety degrees to thereby produce a substantially U-shaped configuration having a flat base and planar end walls extending at generally right angles to opposed margins of said base;
   (b) shearing each of said end walls and portions of said base along lines just below and parallel to one edge of said generally U-shaped configuration said shearing continuing inwardly to a distance defining a central uncut area of said base so as to produce parallel pairs of elements extending in directions opposite from said central uncut area; and
   (c) bending those of said elements which are above said lines such that a first pair of arms are formed spaced intermediate along said one base edge, said arms being substantially parallel to each other and said end walls and extending generally at right angles to said base, each of said arms forming with the associated one of said end walls a first U-shaped channel,
   whereby said jaw interfits below said arms and said jaw having a pair of symmetrically disposed concave wings having an apex portion and locationally mounted adjacent said end walls and slidably contiguous with respect to said end walls for preventing pinching of said cables between said wings and end walls, and said clamp of the type also including means to draw said jaw into compressive engagement with cables nested within said first channel.

2. The method as set forth in claim 1 further comprising the steps of:
   (a) shearing each of said end walls and portions of said base along lines just above and parallel to the other edge of said generally U-shaped configuration said shearing continuing inwardly to said central uncut area so as to produce parallel pairs of elements extending in directions opposite from said central uncut area; and
   (b) bending those of said elements which are below said just above lines such that a second pair of arms are formed spaced intermediate along said other base edge, said arms being substantially parallel to each other and to said end walls and extending at right angles to said base, each of said arms forming with the associated one of said end walls a second U-shaped channel, said first and said second U-shaped channels formed with the same one of said end walls being in alignment with each other to form a channel,
   whereby said jaw interfits between said first and said second pair of arms, said means to draw drawing said jaw into compressive engagement with cables seated within said channel.

3. The method of manufacturing from a strip of resilient sheet metal a body portion of an electrical cable clamp of the type which includes a jaw movable with respect to said body portion, comprising the steps of:
   (a) stamping resilient sheet metal into said strip;
   (b) bending the ends of the strip through an angle of essentially ninety degrees to thereby produce a substantially U-shaped configuration having a flat base and planar end walls extending at generally right angles to opposed margins of said base;
   (c) shearing each of said end walls and portions of said base along lines just below and parallel to one edge of said generally U-shaped configuration said shearing continuing inwardly to a distance defining a central uncut area of said base so as to produce parallel pairs of elements extending in directions opposite from said central uncut area; and
   (d) bending those of said elements which are above said lines such that a first pair of arms are formed spaced intermediate along said one base edge, said arms being substantially parallel to each other and said end walls and extending generally at right angles to said base, each of said arms forming with the associated one of said end walls a first U-shaped channel, whereby said jaw interfits below said arms and said jaw having a pair of symmetrically disposed concave wings having an apex portion and locationally mounted adjacent said end walls and slidably contiguous with respect to said end walls for preventing pinching of said cables between said wings and end walls, and said clamp of the type also including means to draw said jaw into compressive engagement with cables nested within said first channel.

* * * * *